(12) United States Patent
Dreyer

(10) Patent No.: US 11,692,385 B2
(45) Date of Patent: Jul. 4, 2023

(54) SYSTEM AND METHOD FOR CONFIGURATION OF DOOR ENTRANCE SYSTEMS

(71) Applicant: ASSA ABLOY ENTRANCE SYSTEMS AB, Landskrona (SE)

(72) Inventor: Roger Dreyer, Bjarred (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 780 days.

(21) Appl. No.: 16/339,434

(22) PCT Filed: Oct. 25, 2017

(86) PCT No.: PCT/EP2017/077348
§ 371 (c)(1),
(2) Date: Apr. 4, 2019

(87) PCT Pub. No.: WO2018/077972
PCT Pub. Date: May 3, 2018

(65) Prior Publication Data
US 2019/0284864 A1    Sep. 19, 2019

(30) Foreign Application Priority Data

Oct. 28, 2016 (SE) .................................... 1630262-2

(51) Int. Cl.
*E05F 15/73* (2015.01)
*E05F 15/70* (2015.01)
*E05F 15/00* (2015.01)

(52) U.S. Cl.
CPC .............. *E05F 15/73* (2015.01); *E05F 15/70* (2015.01); *E05F 15/00* (2013.01);
(Continued)

(58) Field of Classification Search
None
See application file for complete search history.

(56) References Cited

U.S. PATENT DOCUMENTS 5,453,736 A      9/1995  Noren
9,328,548 B2 *   5/2016  Shiraishi ................. E05F 15/74
(Continued)

FOREIGN PATENT DOCUMENTS

CA    2856122 A1 *  5/2013  .............. E05F 15/70
CA    2505202 C  *  8/2013  ............ E05F 15/668
(Continued)

OTHER PUBLICATIONS

International Search Report mailed in PCT/EP2017/077348 dated Jan. 22, 2018.
(Continued)

*Primary Examiner* — Catherine A Kelly
(74) *Attorney, Agent, or Firm* — Wissing Miller LLP

(57) ABSTRACT

The present disclosure relates to a door management system comprising at least one door leaf, at least one a door operator, an electronic communication unit and at least one detector unit wherein the door operator comprise a control unit and a drive unit, wherein the drive unit is connected to and adapted to move the at least one door leaf between an open and a closed position, the control unit comprise a first set of configuration parameters and is adapted to control the drive unit based on the first set of configuration parameters, the at least one detector unit comprise a second set of configuration parameters and is configured to survey the environment of the at least one door leaf based on the second set of configuration parameters, the electronic communication unit comprise a user interface and is configured to receive and display the first and second set of configuration parameters on the user interface, receive and transmit an updated first set of configuration parameters to the control unit and the updated second set of configuration parameters to the at least one detector unit, wherein the control unit is configured to receive and replace the first set of configura- (Continued)

tion parameters with the updated first set of configuration parameters, and the at least one detector is configured to receive and replace the second set of configuration parameters with the updated second set of configuration parameters.

25 Claims, 4 Drawing Sheets

(52) U.S. Cl.
 CPC ..... *E05Y 2400/456* (2013.01); *E05Y 2400/80* (2013.01); *E05Y 2400/81* (2013.01); *E05Y 2400/85* (2013.01); *E05Y 2900/132* (2013.01); *G05B 2219/2628* (2013.01)

(56) References Cited

U.S. PATENT DOCUMENTS

| | | | |
|---|---|---|---|
| 10,956,876 B2 * | 3/2021 | Dreyer | E05F 15/60 |
| 11,230,872 B2 * | 1/2022 | Paulsson | E05F 15/60 |
| 2009/0146777 A1 | 6/2009 | Fitzgibbon et al. | |
| 2013/0049929 A1 * | 2/2013 | Gerlach | E05F 15/77 |
| | | | 340/5.64 |
| 2015/0355828 A1 * | 12/2015 | Kiyomasa | E05F 15/70 |
| | | | 715/771 |

FOREIGN PATENT DOCUMENTS

| | | | | |
|---|---|---|---|---|
| DE | 3515945 | | 11/1986 | |
| DE | 102012210586 | | 12/2013 | |
| DE | 102013100321 | | 7/2014 | |
| DE | 102013212517 A1 * | | 12/2014 | ............. E05F 15/20 |
| EP | 0859298 | | 8/1998 | |
| EP | 1970521 | | 9/2008 | |
| WO | 2004111374 | | 12/2004 | |
| WO | WO-2004111374 A1 * | | 12/2004 | ............. E05F 15/73 |
| WO | 2009008299 | | 1/2009 | |
| WO | WO-2011085482 A1 * | | 7/2011 | ............. E05F 15/77 |
| WO | WO-2015175614 A1 * | | 11/2015 | ............. E05F 15/63 |

OTHER PUBLICATIONS

International Search Report in ITS/SE16/00282, dated Jun. 15, 2017.

* cited by examiner

SYSTEM AND METHOD FOR CONFIGURATION OF DOOR ENTRANCE SYSTEMS

This application is a 371 of PCT/EP2017/077348 filed on Oct. 25, 2017, published on May 3, 2018 under publication number WO 2018/077972, which claims priority benefits from Swedish Patent Application No. 1630262-2 filed Oct. 28, 2016, the disclosure of which is incorporated herein by reference.

TECHNICAL FIELD

The present disclosure relates to a door management system and a method performed in a door management system.

BACKGROUND ART

A door management system where the door leaf is opened as a response to a moving object, such as a person or a car, typically comprises at least one door leaf mounted in a door opening, a detector for identifying the moving object, an access controller for handling the verification of the moving object and a door operator for opening and closing the door leaf/leaves.

A traditional door management system having door operation control is assembled by connecting the door leafs with a door operator. The door operator controls the operation of the door leaf, such as opening and closing of the door leaf and movement of the door leaf in relation to if an object is moving towards or leaving the door opening, e.g. uses presence sensors for detecting a person or moving object who/which is about to enter or have entered and also for personal safety arrangements, e.g. blocking sensors for preventing squeezing of fingers.

The configuration of the door management systems of today is rather time consuming as several different systems have to interact when configuring the systems together with some manual adjustments.

SUMMARY OF THE INVENTION

An object of the present disclosure is to provide a system and method for configuring door entrance systems which seek to mitigate, alleviate, or eliminate one or more of the above-identified deficiencies in the art and disadvantages singly or in any combination.

The present disclosure is defined by the appended claims. Various advantageous embodiments of the disclosure are set forth by the appended claims as well as by the following description and the accompanying drawings.

The present disclosure relates to a door management system comprising at least one door leaf, at least one door operator, an electronic communication unit and at least one detector unit. The door operator comprises a control unit and a drive unit. The drive unit is connected to and configured to move the at least one door leaf between an open and a closed position. The control unit comprise a first set of configuration parameters and is configured to control the drive unit based on the first set of configuration parameters. The at least one detector unit comprise a second set of configuration parameters and is configured to survey the environment of the at least one door leaf based on the second set of configuration parameters. The electronic communication unit comprise a user interface, UI, and is configured to receive the first set of configuration parameters from the control unit and the second set of configuration parameters from the at least one detector unit, display the first and second set of configuration parameters on the UI, receive an updated first and second set of configuration parameters, transmit the updated first set of configuration parameters to the control unit and the updated second set of configuration parameters to the at least one detector unit. The control unit is configured to receive the updated first set of configuration parameters from the electronic communication unit and replace the first set of configuration parameters with the updated first set of configuration parameters, and the at least one detector unit is configured to receive the updated second set of configuration parameters from the electronic communication unit and replace the second set of configuration parameters with the updated second set of configuration parameters.

In one aspect, the electronic communication unit is configured to authenticate the received updated first and second set of configuration parameters.

In one aspect, the electronic communication unit is configured to receive the updated first and second set of configuration parameters via the UI.

In one aspect, the electronic communication unit comprise a central processing unit, CPU, and the CPU is configured to produce the updated first and second set of configuration parameters.

In one aspect, the detector unit is configured to survey the environment of the at least one door leaf, and produce associated survey data, and wherein the electronic communication unit is configured to receive the survey data from the at least one detector unit, and produce the updated first and second set of configuration parameters based on the received survey data.

In one aspect, the CPU is configured to produce the updated first and second set of configuration parameters based on the received survey data and/or received input via the UI.

In one aspect, the electronic communication unit is configured to receive the first and/or second set of configuration parameters from an external electronic communication device.

In one aspect, the CPU is configured to produce the updated first and second set of configuration parameters based on the received survey data, received input via the UI and/or received input from the external electronic communication device.

In one aspect, the control unit is further configured to control any of speed, force and/or position of the drive unit based on the first set of configuration parameters.

In one aspect, the at least one detector unit is configured to detect presence of an object in the vicinity of the at least one door leaf and produce survey data related to the detected presence.

In one aspect, the system further comprises a mode selector comprising a third set of configuration parameters and the mode selector is configured to communicate with the electronic communication unit and the electronic communication unit is configured to receive the third set of configuration parameters from the mode selector, display the third set of configuration parameters on the UI, receive an updated third set of configuration parameters and transmit the updated third set of configuration parameters to the mode selector.

In one aspect, the mode selector is configured to set the operational mode of the door management system based on survey data received from the detector unit.

In one aspect, the at least one detector unit comprises a sensor unit for surveying the environment of the at least one door leaf and produce associated survey data and a communication unit for communicating the survey data with one or more of the control unit, electronic communication unit and mode selector.

In one aspect, the at least one detector unit comprises an actuator unit for activation based on the produced survey data In one aspect, the electronic communication unit comprises a communication circuitry configured to receive survey data and/or one or more set of configuration parameters and to transmit the one or more set of updated configuration parameters.

In one aspect, the electronic communication unit comprises an input unit configured to receive one or more set of configuration parameters inputted by a user via the UI.

In one aspect, the door management system is configured to communicate with one or more door management systems.

In one aspect, the door management system comprises at least two door leafs, at least two door operators, an electronic communication unit and at least two detector units.

The present disclosure relates to a method performed in a door management system comprising at least one door leaf, an electronic communication unit. The method comprises the step of surveying the environment of the at least one door leaf and producing associated survey data. The method comprises the step of producing one or more set of configuration parameters based on the survey data. The method comprises the step of configuring the door management system by using the one or more of the produced set of configuration parameters.

In one aspect, the system comprises at least one detector unit and wherein the step of surveying the environment further comprises the steps of detecting activation of the at least one door leaf, performed by the at least one detector unit, and/or presence of an external object in the vicinity of the at least one door leaf and producing the associated survey data related to the detected activation and/or presence.

In one aspect, the system comprises a door operator and wherein the step of producing configuration parameters further comprises the steps of sending the produced survey data to the electronic communication unit, producing one or more set of configuration parameters based on the survey data and transmitting, via the electronic communication unit, the one or more set of configuration parameters to the door operator and/or at least one detector unit.

In one aspect, the method further comprises the step of setting an operational mode of the system based on the produced survey data.

The present disclosure relates to a computer readable program, which, when executed on an electronic communication unit causes the communication unit to perform the method disclosed above.

An advantage with the provided system is that a common user interface can identify the different components within the system and guide the user through the configuring process with relevant settings for the components within the specific system, thus some user interfaces on accessories of the system, i.e. detectors, mode selector and door operator, can be removed and replaced by the common user interface. The different components within the system communicate and thus can enhance the configuring process both at the setup of the system and when the system is running. Further, the installation time will be shorter and more correct and the system can help to prevent non-compliant, dangerous, settings.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
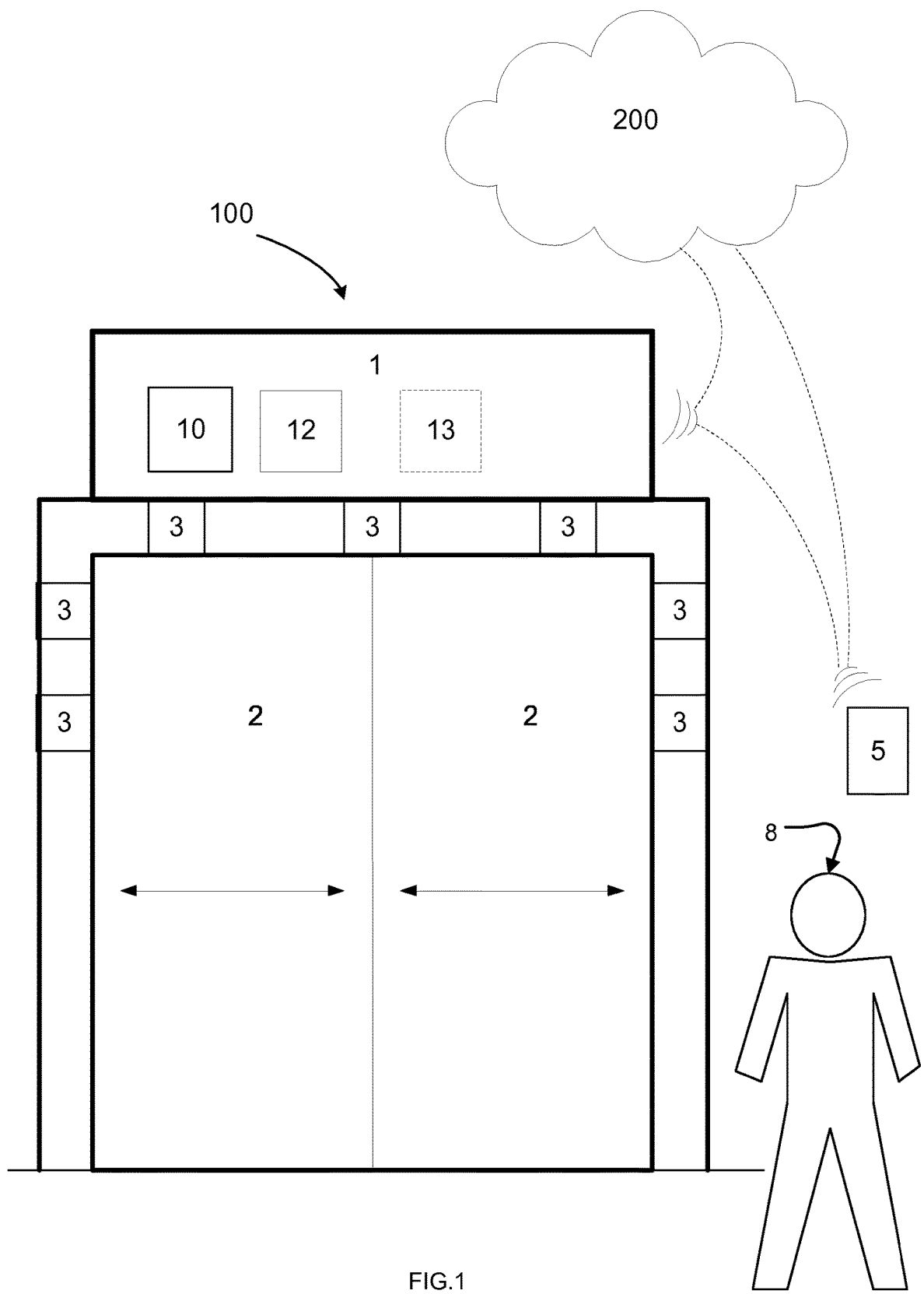
FIG. 1 illustrates an example of a door management system according to the present disclosure, with closed door leafs.

Aspects of the present disclosure will be described more fully hereinafter with reference to the accompanying drawings. The assembly and method disclosed herein can, however, be realized in many different forms and should not be construed as being limited to the aspects set forth herein.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In the door management systems of today since each unit, component or accessory of the system, e.g. door operator, detector units has its own fixed or detachable user interface which has to be configured individually and sometimes manually, which increases the cost of the total system. Further, it is not possible to read out the settings, thus it is not possible to i.e. copy the settings to be used when configuring a replacement unit when the present unit has to be replaced. Further, it is difficult and non-intuitive to configure the unit since the unit is not aware of other configurations within the system.

The present disclosure simplifies setup and configuration of accessories or components within the door management system such as detectors or door operators. The disclosed system provides a possibility to connect one User Interface, UI, to one point of communication in the entrance system and then to communicate and configure all accessories or components within the system instead of doing separate configurations on each of them.

Setups and configuration of the system including all accessories or components will be faster and easier because the person that performs the configuration can connect the user interface to one point of communication and configure the entire system since it is possible to prevent multiple fixed or detachable UI.

All accessories that require software configuration and are connected over a communication interface to other parts of the entrance system are configurable over the same communication interface to simplify setup and parameterization. A removable UI is possible to attach to the communication interface and give access for one point of configuration of all connected accessories. The UI is able to identify all connected accessories and open up all possible settings that are related to the current system setup.

The complexity in configurating the door management system is reduced since the electronic communication unit is able to reduce the number of feasible settings based on the actual system setup. Another advantage is that it is possible to tune the settings in a quicker and more user friendly way. It can also be able to prevent settings that are forbidden from a legal point of view. The legal rights are different from country to country and that is managed by the UI.

Figure 5:
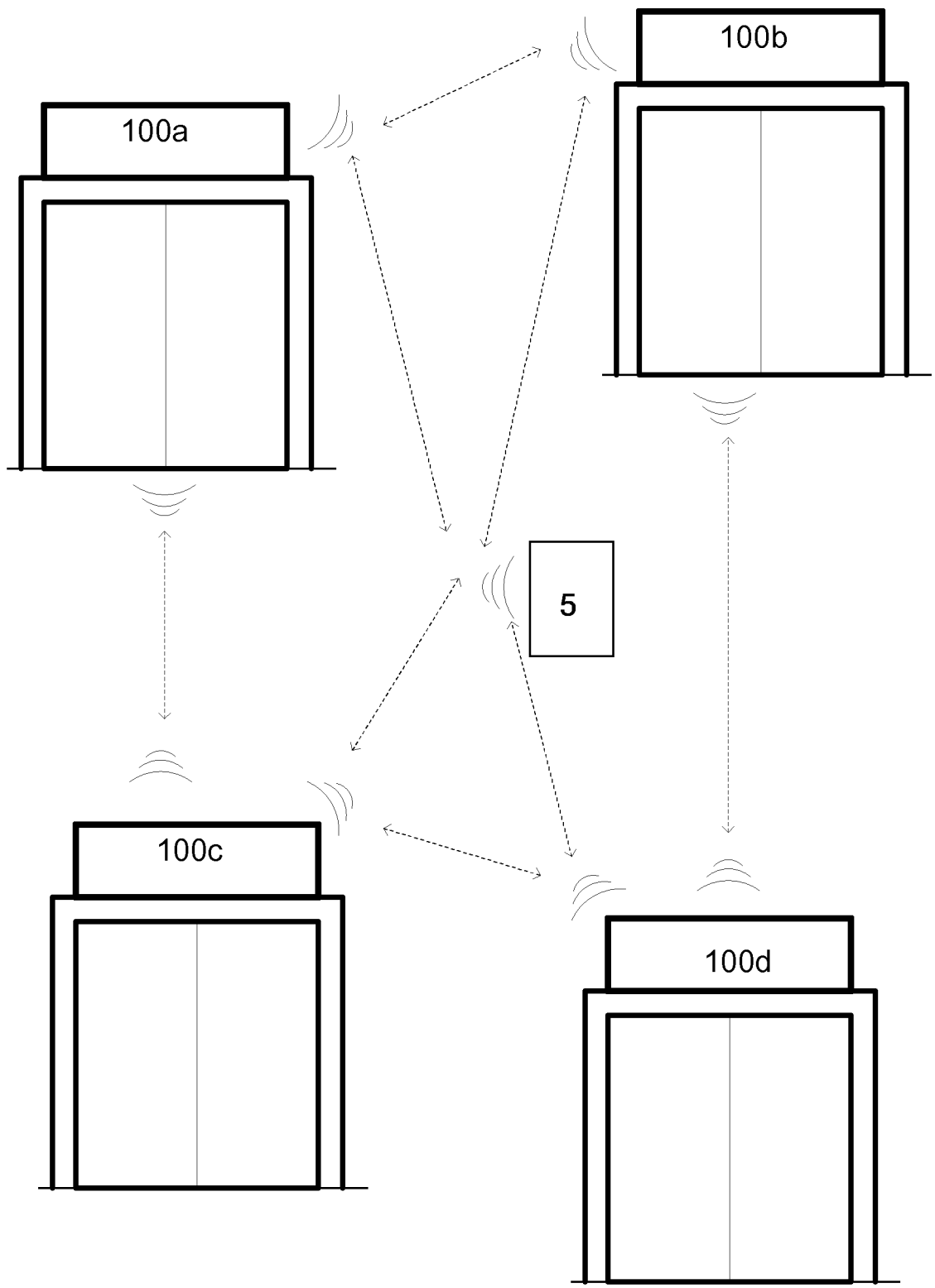
FIG. 5 illustrates several door management systems according to the present disclosure.

The present disclosure presents a door management system 100 comprising at least one door leaf 2 movably arranged in a door opening. The door management system 100 comprises a door operator 1 configured to control the at least one door leaf 2 e.g. opening and closing the door leaf 2, such a door management system 100 is shown in FIGS. 1 and 5. The door leaf 2 is, according to some aspects, movably arranged in the door opening between an open position and a closed position. The door leaf 2 is arranged to block the door opening when the door leaf 2 is in a closed position. The door operator 1 is typically arranged above the door opening. As one alternative, the door operator 1 may be arranged on the door leaf 2, typically at the top of the door leaf 2. Alternatively, the door operator 1 may be arranged under or on the side of the door opening. The door operator 1 may be arranged in any position which allows for the door operator 1 to open and close the door leaf 2. The door operators 1 may be of different types, more specifically, the door operators 1 may be a door operator for a swing door set, a revolving door set and a sliding door set.

The door operator 1 handles the operation of the door leaf 2 by controlling for example the opening speed and the opening time of the door leaf 2. The opening speed is the speed of the door leaf 2 during opening of the door leaf 2. The opening time is time during which the door leaf 2 is open before the door leaf 2 is closed by the door operator 1. The door operator 1 may also control the closing speed of the door leaf 2, which is the speed of the door leaf 2 during closing of the door leaf 2. The door operator 1 may also handle information from safety sensors on, or in the vicinity of the door leaf 2. Safety sensors are used to prevent, for example, pinching a person's fingers in the door or closing before a person has fully passed the door opening.

In one aspect, as shown in FIG. 1, a door management system 100, comprising at least one door leaf 2, at least one a door operator 1, an electronic communication unit 5 and at least one detector unit 3. The door operator 1 comprises a control unit 10 and a drive unit 12. The drive unit 12 is connected to and adapted to move the at least one door leaf 2 between an open and a closed position. The control unit 10 comprise a first set of configuration parameters and is configured to control the drive unit 12 based on the first set of configuration parameters. The at least one detector unit 3 comprise a second set of configuration parameters and is configured to survey the environment of the at least one door leaf 2 based on the second set of configuration parameters.

The electronic communication unit 5 comprise a user interface, UI, and is configured to receive the first set of configuration parameters from the control unit 10 and the second set of configuration parameters from the at least one detector unit 3, display the first and second set of configuration parameters on the UI, receive an updated first and second set of configuration parameters and transmit the updated first set of configuration parameters to the control unit 10 and the updated second set of configuration parameters to the at least one detector unit 3. The control unit 10 is configured to receive the updated first set of configuration parameters from the electronic communication unit 5 and replace the first set of configuration parameters with the updated first set of configuration parameters. The at least one detector 3 unit is configured to receive the updated second set of configuration parameters from the electronic communication unit 5 and replace the second set of configuration parameters with the updated second set of configuration parameters.

In one example, a user connects to the door management system 100 via the electronic communication unit 5, such as a tablet or a smartphone. The present first and a second set of configuration parameters is presented to the user via the User Interface of the electronic communication unit 5, e.g. on the display of the smartphone. The user may then change the first and second set of configuration parameters, if necessary, and then transmit the updated first and/or second configuration parameters to the door operator 1 and the detector unit 3. The door operator 1 and the detector units 3 then reconfigure and replace its set of configuration parameters with the updated set of configuration parameters.

The set of configuration parameters relates to the door operator 1 and includes one or more of the following: the opening speed, the opening time of the door leaf, the closing speed of the door leaf, the handling of information from safety sensors on, or in the vicinity of the door. The second set of configuration parameters relates to the detector unit 3 and includes one or more of the following: the position of the detector unit 3, the angle of the detector, the sensitivity of the detector.

In one aspect, the electronic communication unit 5 is configured to authenticate the received updated first and second set of configuration parameters.

In one aspect, the electronic communication unit 5 is configured to receive the updated first and second set of configuration parameters via the UI.

Figure 2:
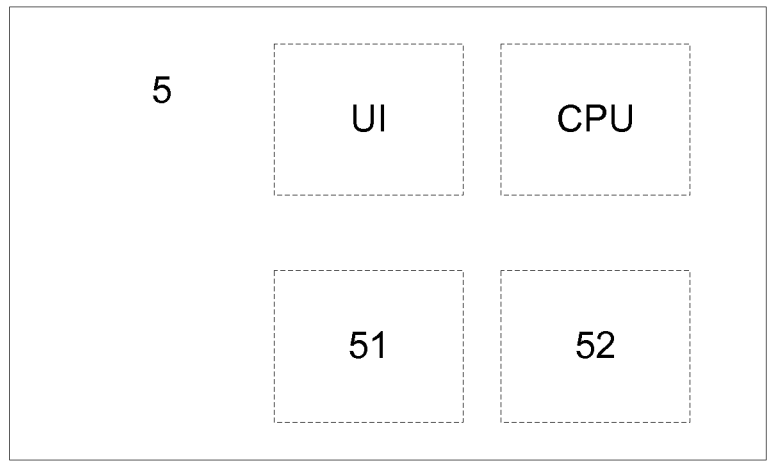
FIG. 2 illustrates the example of an electronic communication unit according to the present disclosure.

In one aspect, as shown in FIG. 2, the electronic communication unit 5 comprise a central processing unit, CPU, and the CPU is configured to produce the updated first and second set of configuration parameters.

In one aspect, the detector unit 3 is configured to survey the environment of the at least one door leaf 2 and to produce associated survey data. The electronic communication unit 5 is configured to receive the survey data from the at least one detector unit 3 and to produce the updated first and second set of configuration parameters based on the received survey data.

The survey data includes one or more of the following data: the temperature, the presence of an external object, the size of the door leaf, the position of the door leaf, the moving direction of the external object. An external object may be any object moving towards or away from the door leaf 2 such as a person, an animal, a vehicle etc.

In one aspect, the CPU is configured to produce the updated first and second set of configuration parameters based on the received survey data and/or received input via the UI.

In one aspect, the electronic communication unit 5 is configured to receive the first and/or second set of configuration parameters from an external electronic communication device 200.

In one aspect, the CPU is configured to produce the updated first and second set of configuration parameters based on the received survey data, received input via the UI and/or received input from the external electronic communication device 200 or of a combination thereof.

In one aspect, as shown in FIG. 2, the electronic communication unit 5 comprises a communication circuitry 51 configured to receive survey data and/or one or more set of configuration parameters and transmit the one or more set of updated configuration parameters.

In one aspect, the electronic communication unit 5 comprises an input unit 53 configured to receive one or more of the set of configuration parameters inputted by a user 8 via the UI.

In one example, the set of the first and second configuration parameters can be provided manually via the electronic communication unit 5 e.g. a smartphone, or downloaded from an external server 200.

In one example, the inputted first set of configuration parameters for the door operator 1 are shown on the UI and based on the inputted first set of configuration parameters the CPU calculates and the UI displays a suggestion of how the second set of configuration parameters for the detector unit 3 could be (or the opposite). The user 8 could chose to update the set of configuration parameters to be the suggested set or to manually input other values for the set of configuration parameters for the other unit in the system. In one example, the inputted first set of configuration parameters automatically updates one or more of the other set of configuration parameters.

In one example, the electronic communication unit 5 comprises a configuration tool. The configuration tool facilitates handling of pictures, videos, and sounds and makes it possible to point at the screen and type in text and figures over the keyboard. The configuration tool can be linked to the internet and download new sets of configuration parameters and user manuals for the specific system that are relevant for the user doing the configuration or parameterization. The configuration tool can be an application downloaded by the electronic communication unit 5, which communicates with one or several units in the system 100, which acts as a web page and communicates with a general web browser. The configuration tool is adapted to handle standard file formats like pdf, word, excel, mov, and any other formats that contain installation information and/or guidance to improve quality and speed of installation and configuration.

In one aspect, the control unit 10 is further configured to control any of speed, force and/or position of the drive unit 12 based on the first set of configuration parameters.

In one aspect, the at least one detector unit 3 is configured to detect presence of an object in the vicinity of the at least one door leaf 2 and produce survey data related to the detected presence.

In one aspect, the door management system 100 further comprises a mode selector 13 comprising a third set of configuration parameters and the mode selector 13 is configured to communicate with the electronic communication unit 5. The electronic communication unit 5 is configured to receive the third set of configuration parameters from the mode selector 13, display the third set of configuration parameters on the UI, receive an updated third set of configuration parameters and transmit the updated third set of configuration parameters to the mode selector 13. In one aspect, the mode selector 13 is configured to set the operational mode of the door management system 100 based on survey data received from the detector unit 3.

Example of operational modes may be any of open or closed door, one-way traffic, automatic traffic, only open at specific time intervals e.g. between 9 pm and 4 am.

In one example, the at least one detector unit 3 is configured to communicate with the mode selector 13. In one example, the detector unit 3 communicates the temperature to the mode selector 13 which set the operational mode to keep the door leafs 2 in the closed position to prevent the warm or cold air from outside to flow into a building.

Figure 3:
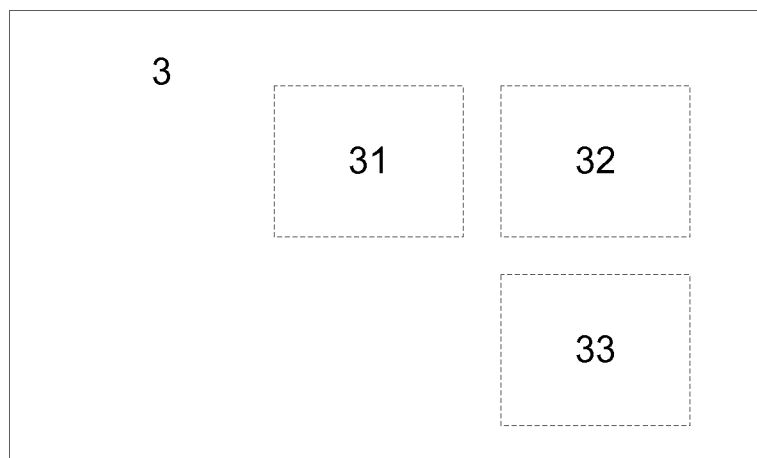
FIG. 3 illustrates the example of a detector unit according to the present disclosure.

In one aspect, as shown in FIG. 3, the at least one detector unit 3 comprises a sensor unit 31 for surveying the environment of the at least one door leaf 2 and produce associated survey data and a communication unit 32 for communicating the survey data with one or more of the control unit 10, the electronic communication unit 5 and the mode selector 13.

In one aspect, the at least one detector unit 3 comprises an actuator unit 33 for activation based on the produced survey data.

In one aspect, as shown in FIG. 5, the door management system 100 is configured to communicate with one or more similar door management systems 100a, 100b, 100c, 100d. In one example, a hospital has several door management systems 100 which are connected and communicates with each other. It is possible to set and update all set of configuration parameters of all connected door management systems 100 at the same time from a single electronic communication unit 5. In one aspect, the door management system 100, comprising at least two door leafs 2, at least two door operators 1, an electronic communication unit 5 and at least two detector units 3. In one example, the door management system 100 comprise two door leafs 2 with door operators 1 that forms an airlock between them and it is possible to set and update the set of configuration parameters for both the door leafs 2 and the door operators 1 from the electronic communication unit 5 to set up the airlock.

In one example, the CPU comprises one or several processors or one or several cores. In the case of several processors, the processors work together as a unit and have a combined functionality. In other words, the processors do not have separated functionalities but cooperate as one unit.

In one example, the electronic communication device 5 is connected to the detector units 3 and/or door operators 1 with a wire suitable for sending electronic signals.

According to some aspects, the electronic communication unit 5 is connected to the detector units 3 and/or the door operator 1 via a wireless connection suitable for sending electronic signals. The connection may also be a combination of wired and wireless connection. Examples of wireless connections are Bluetooth™, Wi-Fi, Infrared, or any other kind of near field communication technology. In the case of wireless connection there will be a transceiver for the wireless signal on both the electronic communication unit 5 side and the detector unit 3 side.

A method for how the door management system 100 could be configured will now be described starting from FIG. 4 disclosing method steps, performed in a door management system 100 comprising at least one door leaf 2, an electronic communication unit 5, at least one detector unit 3 and at least one door operator 1 comprising a control unit 10 and a drive unit 12.

When the described steps are not dependent on each other, these steps may be implemented in any combination.

In the first step S1 the at least one detector unit 3 is surveying the environment of the at least one door leaf 2 and producing associated survey data. In one aspect, the step of surveying S1 the environment further comprises detecting S11 activation of the at least one door leaf 2 and/or presence of an external object in the vicinity of the at least one door leaf 2 and producing S12 survey data related to the detected activation and/or presence.

In the second step S2 one or more set of configuration parameters is produced based on the transmitted survey data. In one aspect, the step of producing configuration parameters S2 further comprises the steps of sending S21 the survey data to the electronic communication unit 5, producing S22 one or more configuration parameters based on the survey data and transmitting S23, via the electronic communication unit 5, the one or more configuration parameters to the control unit 10.

In the third step S3 the door management system 100 is configured by using the one or more of the received updated set of configuration parameters.

In one aspect, the method further comprises setting an operational mode of the system 100 based on the survey data.

According to some aspects, the communication between the door operator 1 and the electronic communication unit 5 is encrypted. The communication between the door operator 1 and the electronic communication unit 5 is, for example, encrypted using Secure Sockets Layer, SSL, or Transport Layer Security, TLS. SSL uses a combination of encryption using public keys and symmetrical keys. An SSL session is always initiated by a handshake where the electronic communicating unit 5 agree on which encryption to use. After the handshake procedure, a connection is established and data can be sent between the devices. The data is encrypted using the keys that where agreed upon by the devices during the handshake procedure. SSL may use several different methods of encryption, such as Data Encryption Standard, DES, Digital Signature Algorithm, DSA, Key Exchange Algorithm, KEA, Message-Digest algorithm 5, MD5, Rivest Cipher 2, RC2, Rivest Cipher4, RC4, Rivest, Shamir and Adleman encryption, RSA, Secure Hash Algorithm, SHA-1, SKIPJACK or Triple Data Encryption Standard, Triple-DES.

Figure 4:
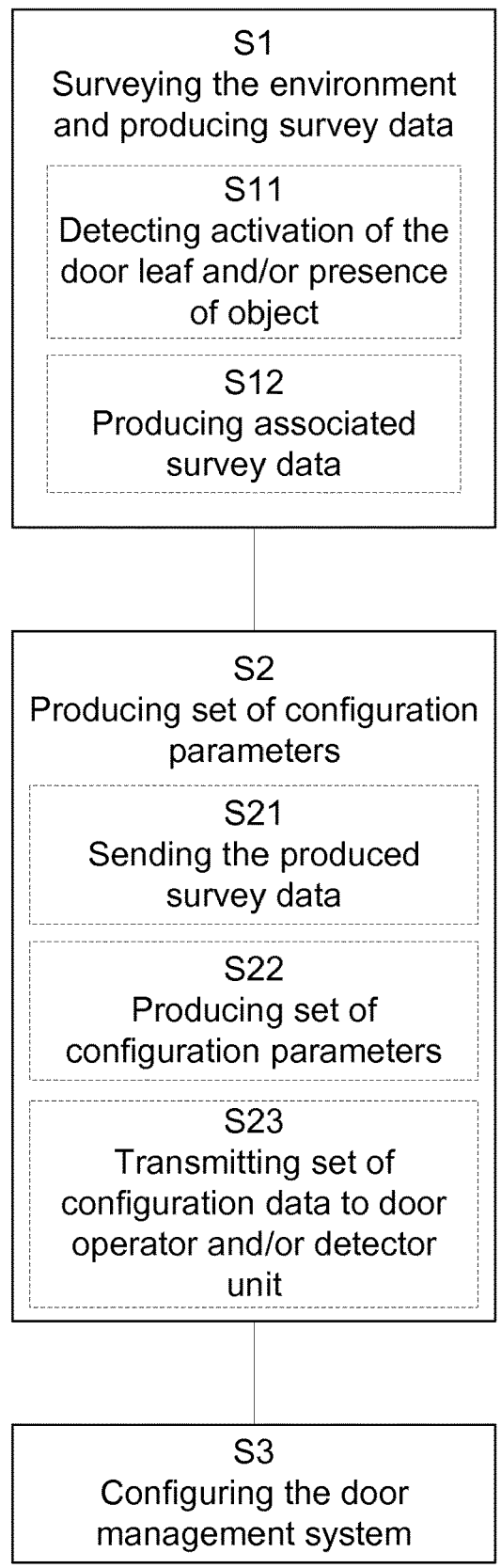
FIG. 4 is a flow chart illustrating the proposed method according to the present disclosure.

It should be appreciated that the flow diagram of FIG. 4 comprises some operations which are illustrated with a solid border and some operations which are illustrated with a dashed border. The operations which are comprised in a solid border are operations which are comprised in the broadest aspects of the disclosure. The operations which are comprised in a dashed line are aspects of the disclosure which may be comprised in, or a part of, or are further operations which may be taken in addition to the operations of the broader aspects of the disclosure. It should be appreciated that the operations need not be performed in order. Furthermore, it should be appreciated that not all of the operations need to be performed. Also, the functions or steps noted in the blocks can, according to some aspects of the disclosure, be executed continuously in a loop.

The description of the aspects of the disclosure provided herein has been presented for purposes of illustration. The description is not intended to be exhaustive or to limit aspects of the disclosure to the precise form disclosed, and modifications and variations are possible in light of the above teachings, or may be acquired from practice of various alternatives to the provided aspects of the disclosure. The examples discussed herein were chosen and described in order to explain the principles and the nature of various aspects of the disclosure, and its practical application, to enable one skilled in the art to utilize the aspects of the disclosure in various manners and with various modifications as are suited to the particular use contemplated. The features of the aspects of the disclosure described herein may be combined in all possible combinations of methods, apparatus, modules, systems, and computer program products. It should be appreciated that the aspects of the disclosure presented herein may be practiced in any combination with each other.

It should be noted that the word "comprising" does not necessarily exclude the presence of other elements or steps than those listed. It should further be noted that any reference signs do not limit the scope of the claims.

The various example embodiments described herein are described in the general context of method steps or processes, which may be implemented according to some aspects by a non-transitory computer readable medium, which, when executed on a processing unit, causes the processing unit to perform the method according to above. A computer-readable medium may include removable and non-removable memory unit including, but not limited to, Read Only Memory, ROM, Random Access Memory, RAM, compact discs, CDs, digital versatile discs, DVD, etc. Generally, program modules may include routines, programs, objects, components, data structures, etc. that performs particular tasks or implement particular abstract data types. Computer-executable instructions, associated data structures, and program modules represent examples of program code for executing steps of the method disclosed herein. The particular sequence of such executable instructions or associated data structures represents examples of corresponding acts for implementing the functions described in such steps or processes.

In one aspect a computer readable program, which, when executed on an electronic communication unit 5 causes the electronic communication unit 5 to perform the method disclosed above.

In the drawings and specification, there have been disclosed exemplary aspects. However, many variations and modifications can be made to these aspects. Accordingly, although specific terms are employed, they are used in a generic and descriptive sense only and not for purposes of limitation, the scope of the embodiments being defined by the following claims.

The invention claimed is:

1. A door management system comprising at least one door leaf, at least one door operator, an electronic communication unit and at least one detector unit wherein:
the at least one door operator comprises a control unit and a drive unit, the drive unit is connected to and configured to move the at least one door leaf between an open and a closed position,
the control unit comprises a first set of configuration parameters and is configured to control the drive unit based on the first set of configuration parameters,
the at least one detector unit comprises a second set of configuration parameters and is configured to survey the environment of the at least one door leaf based on the second set of configuration parameters,
the electronic communication unit comprises a user interface, and is configured to:
receive the first set of configuration parameters from the control unit and the second set of configuration parameters from the at least one detector unit,
display the first and second set of configuration parameters on the user interface, receive an updated first and second set of configuration parameters, transmit the updated first set of configuration parameters to the control unit and the updated second set of configuration parameters to the at least one detector unit, the control unit is configured to receive the updated first set of configuration parameters from the electronic communication unit and replace the first set of configuration parameters with the updated first set of configuration parameters, and the at least one detector unit is configured to receive the updated second set of configuration parameters from the electronic communication unit and to replace the second set of configuration parameters with the updated second set of configuration parameters, wherein the electronic communication unit retains the updated first set of configuration parameters and the updated second set of configuration parameters after transmitting the updated first set of configuration parameters to the control unit and the updated second set of configuration parameters to the at least one detector unit.

2. The door management system according to claim 1, wherein the electronic communication unit is configured to authenticate the received updated first and second set of configuration parameters.

3. The door management system according to claim 1, wherein the electronic communication unit is configured to receive the updated first and second set of configuration parameters via the user interface.

4. The door management system according to claim 1, wherein the electronic communication unit comprises a central processing unit configured to produce the updated first and second set of configuration parameters.

5. The door management system according to claim 4, wherein the detector unit is configured to:

survey the environment of the at least one door leaf, and produce associated survey data, and wherein the electronic communication unit is configured to:

receive the survey data from the at least one detector unit, and produce the updated first and second set of configuration parameters based on the received survey data.

6. The door management system according to claim 5, wherein the central processing unit is configured to produce the updated first and second set of configuration parameters based on the received survey data and/or received input via the user interface.

7. The door management system according to claim 5, wherein the survey data includes a temperature, and the door management system keeps the door closed when the temperature meets a temperature threshold.

8. The door management system according to claim 5, wherein the survey data includes a size of the at least one door leaf.

9. The door management system according to claim 4, wherein the electronic communication unit is configured to receive the first and/or second set of configuration parameters from an external electronic communication device.

10. The door management system according to claim 9, wherein the central processing unit is configured to produce the updated first and second set of configuration parameters based on the received survey data, received input via the user interface and/or received input from the external electronic communication device.

11. The door management system according to claim 1, wherein the control unit is further configured to control any of speed, force and/or position of the at least one door leaf based on the first set of configuration parameters.

12. The door management system according to claim 1, wherein the at least one detector unit is configured to:

detect presence of an object in the vicinity of the at least one door leaf; and produce survey data related to the detected presence.

13. The door management system according to claim 1, wherein the system further comprises a mode selector comprising a third set of configuration parameters, and the mode selector is configured to communicate with the electronic communication unit, and the electronic communication unit is configured to:

receive the third set of configuration parameters from the mode selector, display the third set of configuration parameters on the user interface, receive an updated third set of configuration parameters; and transmit the updated third set of configuration parameters to the mode selector.

14. The door management system according to claim 13, wherein the mode selector is configured to set the operational mode of the door management system based on survey data received from the detector unit.

15. The door management system according to claim 1, wherein the at least one detector unit comprises:

a sensor unit for surveying the environment of the at least one door leaf and produce associated survey data; and a communication unit for communicating the survey data with one or more of the control unit, the electronic communication unit and the mode selector.

16. The door management system according to claim 1, wherein the at least one detector unit comprises:

an actuator unit for activation based on the produced survey data.

17. The door management system according to claim 1, wherein the electronic communication unit comprises:

a communication circuitry configured to:

receive survey data and/or one or more set of configuration parameters; and transmit the one or more set of updated configuration parameters.

18. The door management system according to claim 1, wherein the electronic communication unit comprises an input unit configured to receive one or more set of configuration parameters inputted by a user via the user interface.

19. The door management system according to claim 1, wherein the system is configured to communicate with one or more additional door management systems.

20. The door management system according to claim 1, comprising at least two additional door leaves and at least two additional door operators.

21. A method performed in the door management system according to claim 5, wherein the method comprises:

surveying the environment of the at least one door leaf (2) and producing the associated survey data;

producing the first and second set of configuration parameters based on the survey data; and configuring the door management system by using the one or more of the produced first and second set of configuration parameters.

22. The method according to claim 21, wherein the step of surveying (S1) the environment further comprises:

detecting activation of the at least one door leaf, and/or presence of an external object in the vicinity of the at least one door leaf by the at least one detector unit; and producing the associated survey data related to the detected activation and/or presence.

23. The method according to claim 21, wherein the step of producing configuration parameters further comprises:

sending the produced survey data to the electronic communication device;

producing one or more set of configuration parameters based on the survey data;

transmitting, via the electronic communication device, the one or more set of configuration parameters to the door operator and/or at least one detector unit.

24. The method according to claim 21, wherein the method further comprises:

setting an operational mode of the door management system based on the produced survey data.

25. A computer readable program, which, when executed on the electronic communication unit, causes the electronic communication unit to perform the method according to claim 21.

* * * * *